(12) United States Patent
Domig

(10) Patent No.: US 10,843,721 B2
(45) Date of Patent: Nov. 24, 2020

(54) STEERING COLUMN COMPRISING AN ENERGY ABSORPTION DEVICE FOR A MOTOR VEHICLE

(71) Applicants: THYSSENKRUPP PRESTA AG, Eschen (LI); thyssenkrupp AG, Essen (DE)

(72) Inventor: Markus Domig, Bartholomäberg (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 69 days.

(21) Appl. No.: 16/341,116

(22) PCT Filed: Oct. 18, 2017

(86) PCT No.: PCT/EP2017/076614
§ 371 (c)(1),
(2) Date: Apr. 11, 2019

(87) PCT Pub. No.: WO2018/073306
PCT Pub. Date: Apr. 26, 2018

(65) Prior Publication Data
US 2020/0189648 A1    Jun. 18, 2020

(30) Foreign Application Priority Data
Oct. 19, 2016    (DE) .................. 10 2016 220 533

(51) Int. Cl.
*B62D 1/19*    (2006.01)
*B62D 1/20*    (2006.01)

(52) U.S. Cl.
CPC ............... *B62D 1/195* (2013.01); *B62D 1/20* (2013.01)

(58) Field of Classification Search
CPC ................................ B62D 1/195; B62D 1/192
See application file for complete search history.

(56) References Cited

U.S. PATENT DOCUMENTS

| 7,963,561 | B2 * | 6/2011 | Waibel | B62D 1/184 280/777 |
| 2012/0267884 | A1 * | 10/2012 | Fujiwara | B62D 1/195 280/777 |

(Continued)

FOREIGN PATENT DOCUMENTS

| DE | 102011015140 A | 9/2012 | |
| DE | 102014101631 B3 * | 6/2015 | ............. B62D 1/189 |

(Continued)

OTHER PUBLICATIONS

S. Huber, DE 10 2014 101631 B3 Machine English Translation, ip.com (Year: 2014).*

(Continued)

*Primary Examiner* — Karen Beck
(74) *Attorney, Agent, or Firm* — thyssenkrupp North America, LLC

(57) ABSTRACT

A steering column may include an inner casing tube that rotatably mounts a steering shaft, an outer casing unit in which the inner casing tube is displaceable and fixable in an axial direction, and an energy absorption device operatively disposed between the casing tube and the casing unit. The energy absorption device absorbs at least some energy in a crash event when the casing tube is telescopically displaced relative to the casing unit. The energy absorption device may have at least two deformation strips fastened to the casing tube, and a deformation slide may be disposed on each strip. Each deformation slide may be connected to the casing unit and may encompass and jam external narrow sides of the respective deformation strip so that each deformation slide deforms the respective deformation strip when the deformation slide in a crash event is displaced in the axial direction on the deformation strip.

8 Claims, 3 Drawing Sheets

(56) References Cited

U.S. PATENT DOCUMENTS

| | | | | |
|---|---|---|---|---|
| 2018/0050719 A1* | 2/2018 | Agbor | ............... | B62D 1/184 |
| 2019/0023303 A1* | 1/2019 | Wojtalik | ............ | B62D 1/185 |
| 2019/0161108 A1* | 5/2019 | Kwon | ............... | B62D 1/184 |
| 2020/0039569 A1* | 2/2020 | Schnitzer | ........... | B62D 1/184 |

FOREIGN PATENT DOCUMENTS

| | | | | |
|---|---|---|---|---|
| DE | 102015207230 B | 3/2016 | | |
| DE | 102015204894 A | 9/2016 | | |
| EP | 1612122 A | 1/2006 | | |
| EP | 2900540 A | 8/2015 | | |
| WO | 2014048535 A | 4/2014 | | |
| WO | WO-2018141819 A1 * | 8/2018 | ............ | B62D 1/192 |
| WO | WO-2019030175 A1 * | 2/2019 | ............ | B62D 1/185 |

OTHER PUBLICATIONS

English Translation of International Search Report issued in PCT/EP2017/076614, dated Jan. 10, 2018.

* cited by examiner

STEERING COLUMN COMPRISING AN ENERGY ABSORPTION DEVICE FOR A MOTOR VEHICLE

CROSS REFERENCE TO RELATED APPLICATIONS

This application is a U.S. National Stage Entry of International Patent Application Serial Number PCT/EP2017/076614, filed Oct. 18, 2017, which claims priority to German Patent Application No. DE 10 2016 220 533.1, filed Oct. 19, 2016, the entire contents of both of which are incorporated herein by reference.

FIELD

The present disclosure generally relates to steering columns, including motor vehicle steering columns with energy absorption devices.

BACKGROUND

A steering column in which a strip-shaped deformation element is pulled though a brake having a constricted portion and on account thereof is deformed is known from German Patent Publication No. DE 10 2011 015 140 A1. Part of the energy arising in the event of a crash is absorbed herein and used for the deformation of the deformation element. It is a disadvantage of this solution that the amount of energy to be absorbed is limited in its maximum amount and insufficient in specific crash events.

Thus a need exists for a generic steering column having an energy absorption device where the quantity of energy to be absorbed in a crash event is higher than in the prior art. Furthermore, a need exists for an adaptive energy absorption device that requires only minor installation space.

DETAILED DESCRIPTION

Figure 1:
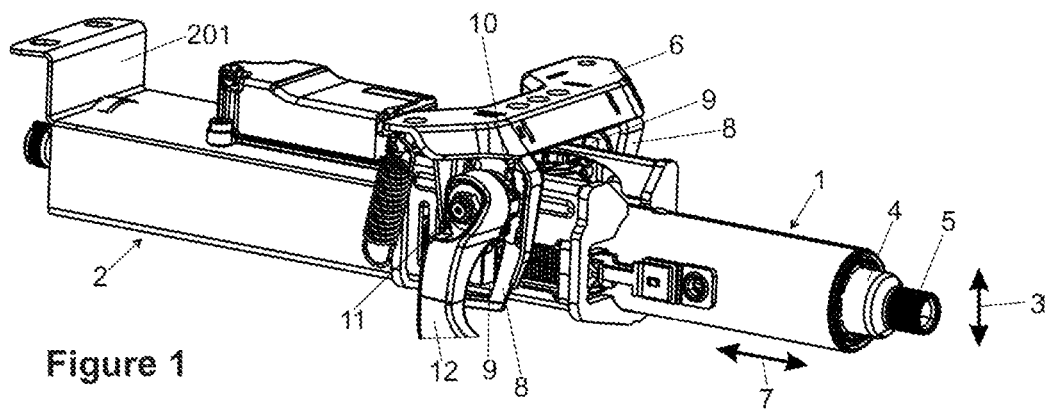
FIG. 1 is a perspective view of an example steering column with an energy absorption device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In one example, a steering column may include an inner casing tube that rotatably mounts a steering shaft, an outer casing unit that is connectable to a vehicle chassis and in which outer casing unit the inner casing tube is received so as to be displaceable and fixable in the axial direction. The steering column may also include an energy absorption device that is operatively disposed between the casing tube and the casing unit and in which part of some of the energy arising in a crash event is capable of being absorbed when the casing tube is telescopically displaced in relation to the casing unit.

In some examples, an energy absorption device may comprise at least two deformation strips which are fastened to the casing tube and on which in each case one deformation slide which is connected to the casing unit and which encompasses and jams the external narrow sides of the respective deformation strip is disposed. The deformation slide may deform the respective deformation strip when the deformation strip in the crash event is displaced in the axial direction with respect to the deformation slide.

The invention therefore provides two or more deformation strips. More energy can be absorbed in the deformation of two or more deformation strips than with a single deformation strip. On account thereof, the energy absorbed in the crash event is also sufficient for vehicles having a higher demand for absorbable energy.

The deformation strips are advantageously disposed on the same side of the casing tube. This makes a compact construction possible. Two or more deformation strips can thus be used without additional construction space needing to be provided for this purpose.

One advantageous design embodiment of the invention furthermore provides that the deformation slides are connected to the outer casing unit by way of a rack plate, wherein an arrestor element provided with teeth is connected to the outer casing unit by way of a tightening device which pushes the arrestor element against the rack plate so as to in the travelling operation fix the latter in an immovable manner on the casing unit such that a displacement of the casing tube in relation to the casing unit in the crash event is possible only by activating the energy absorption device. This assembly requires particularly little installation space.

The arrestor element being pushed against the rack plate is to be understood that the arrestor element and the rack plate are mutually engaged. To this end, it is not necessary for a force to pre-tension the arrestor element in the direction of the rack plate.

The tightening device can preferably comprise a first lifting disk and a second lifting disk, wherein the first lifting disk is connected in a rotationally fixed manner to an activation lever and a tensioning bolt and interacts with the second lifting disk, wherein in a rotation of the first lifting disk in relation to the second lifting disk by means of the activation lever a clamping stroke is provided in the direction of the tensioning axis. The second lifting disk is coupled to the arrestor part. The first lifting disk preferably comprises a cam portion. The second lifting disk preferably comprises a cam track contour which can interact with the cam portion.

The tightening device by means of an activation lever is either tightened or released, also referred to as the fixing position and the releasing position. In the released state (releasing position) of the tightening device, the casing tube can be telescoped in relation to the casing unit, on the one hand. In the tensioned state (fixing position), the casing tube is blocked in relation to the casing unit such that a displacement of the casing tube in relation to the casing unit is possible only when a force which exceeds a predetermined breakaway force is introduced into the steering shaft. In other words, in the crash event the casing tube can telescope into the casing unit while energy is absorbed by the energy absorption device. The tightening device in the normal operation is in the fixing position in which the adaptation of the steering shaft position, that is to say the adjustment of the casing tube in relation to the casing unit, is prevented.

In one embodiment, as an alternative to a manual adjustment, it is possible that the casing tube and the casing unit are capable of being mutually telescoped by means of a motorized drive. The fixing capability of the casing tube in the relation to the casing unit is implemented by the standstill of the motorized drive, and in one advantageous embodiment is implemented by a self-locking gear mechanism.

The invention in terms of the required installation space is further improved when the deformation strips are disposed on top of one another, wherein a second deformation strip that lies closer to the casing tube is preferably configured so as to be wider than the first deformation strip that is disposed on the second deformation strip, wherein the second deformation slide that is disposed on the second deformation strip is preferably wider than the first deformation slide that is disposed on the first deformation strip, such that said second deformation slide encompasses both deformation strips but jams only the second deformation strip, and wherein the first deformation slide encompasses and jams only the first deformation strip.

In the case of this construction mode, both deformation strips are disposed one above the other on the same side of the casing tube and said two deformation strips require hardly any more installation space than an energy absorption device according to the prior art having a single deformation strip. Nevertheless, the first deformation slide deforms only the first deformation strip, and the second deformation slide deforms only the second deformation strip. The two deformation slides can be disposed behind one another in the axial direction. In the crash event, both deformation slides are pulled over both deformation strips, i.e. there is a relative movement between the deformation slides and the deformation strips.

The deformation strips are advantageously held at a mutual spacing by spacers and in the radial direction are fixed between the casing tube and the rack plate. This prevents any bending of the deformation strips and any slipping of the latter from the respective deformation slides, and guarantees uninterrupted functioning.

The spacers are advantageously disposed on the second deformation strip. Said spacers can thus be assembled conjointly with the second deformation strips in one single operative step.

In an advantageous design embodiment the spacers are disposed both on the upper side of the second deformation strip that faces the first deformation strip as well as on the lower side of the second deformation strip that faces the casing tube. The second deformation tube herein is not only held and fixed at a spacing in relation to the first deformation strip but also in relation to the casing tube.

In one advantageous embodiment that is simple to produce, the spacers are designed as studs or a web, and are molded in the second deformation strip.

In one advantageous refinement the deformation strip and the spacers are a single-piece integral component.

The rack plate advantageously comprises two rows of teeth which are disposed beside one another, wherein the toothings of the rows of teeth are disposed so as to be mutually offset by half a tooth width. The engagement behavior with the arrestor element is thus improved.

In one advantageous refinement the rack plate, the first deformation slide and the second deformation slide are configured as a single-part integral component.

A steering column according to the invention, in which an inner casing tube 1 is mounted in an outer casing unit 2 so as to be longitudinally displaceable in the axial direction 3 is shown in FIG. 1. A steering shaft 4 is rotatably mounted in the casing tube 1, a steering wheel (not shown) being able to be assembled on the end 5 of said steering shaft 4 that faces the driver of the motor vehicle. The casing unit 2 is capable of being connected to the vehicle chassis (not shown) by way of a holder 6. The holder 6 is capable of being fixed to the vehicle chassis by means of fastening means, while the casing unit 2 is mounted so as to be pivotable in the vertical direction 7 in relation to the holder 6.

The holder 6 for the pivotable mounting is provided with two clamping jaws 8 which encompass the casing unit 2 and which have vertical slots 9 configured as elongate bores. The casing unit 2 comprises a fastening portion 201 which is capable of being connected to the vehicle chassis and is elastically deformed by an adjustment in the vertical direction 7. A tightening device 10 is provided with a tensioning bolt 11 which passes through the vertical slots 9 of the clamping jaws 8 and through two bores 13 of the casing unit 2. The tightening device 10 comprises a first lifting disk 101, configured as a cam disk, and a second lifting disk 102, configured as a cam track disk, wherein the second lifting disk has a cam track 103. The first lifting disk 101 is connected in a rotationally fixed manner to an activation lever 12 and the tensioning bolt 11. The tightening device 10, by means of the activation lever 12, is either tightened or released in that the first lifting disk 101 in relation to the second lifting disk 102 is rotated about the axis of the tensioning bolt 11. In the released state (releasing position) of the tightening device 10, the casing tube 1 can be displaced in the axial direction 3 in relation to the casing unit 2, on the one hand, and the casing unit 2 can be pivoted in the vertical direction 7 in relation to the holder 6, on the other hand. On account thereof, a longitudinal adjustment of the steering wheel in the axial direction 3 and a height adjustment of the steering wheel in the vertical direction 7 are enabled. In the tightened state (fixing position) of the tightening device 10, the casing tube 1 is tightly clamped in the casing unit 2 and the casing unit 2 is also tightly clamped in the holder 6 such that the steering column is fixed and a height adjustment or longitudinal adjustment of the steering wheel is no longer possible.

Figure 2:
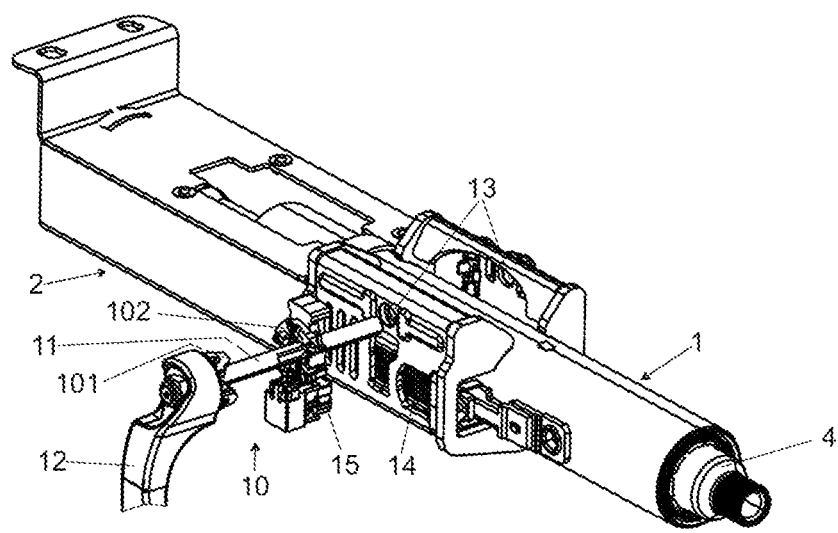
FIG. 2 is a perspective view of an example inner casing tube having an energy absorption device and a tightening device.
Figure 3:
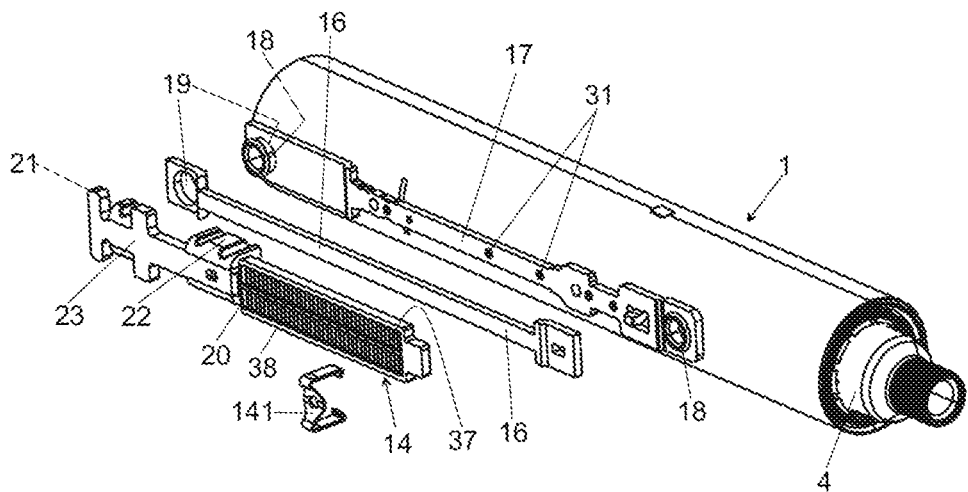
FIG. 3 is an exploded view of an example energy absorption device on a casing tube.
Figure 4:
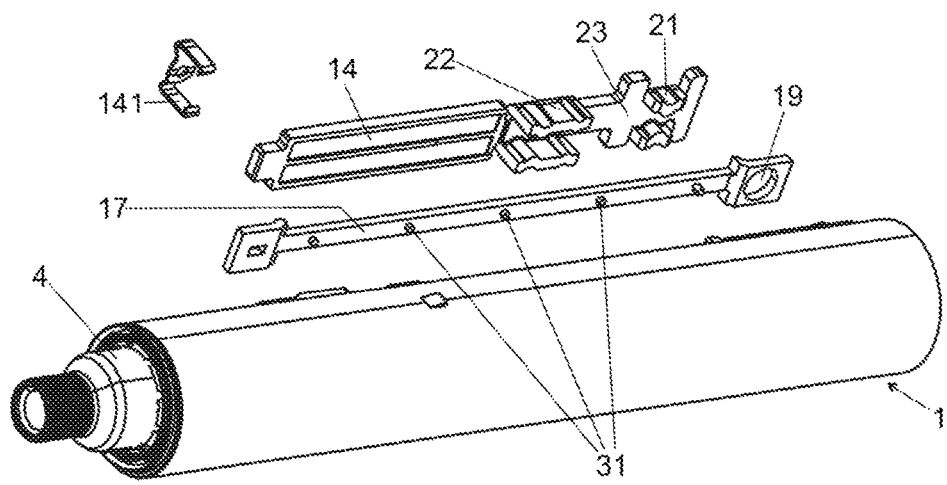
FIG. 4 is an exploded view similar to that of FIG. 3, but from another angle.
Figure 5:
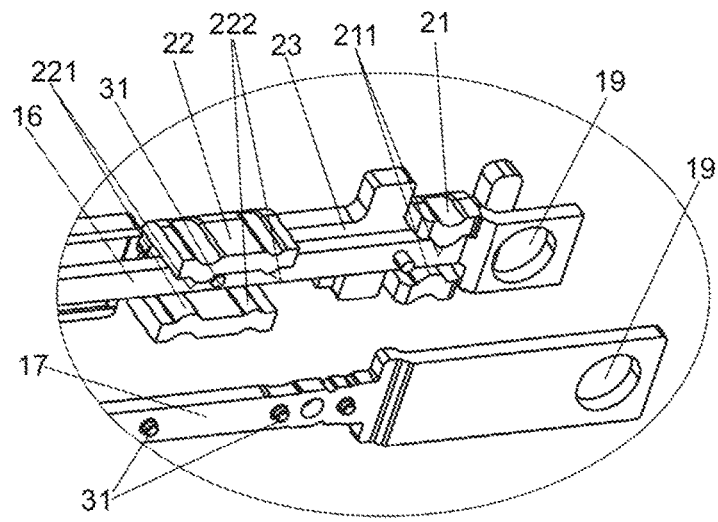
FIG. 5 is a perspective partial view of a partially disassembled energy absorption device.
Figure 6:
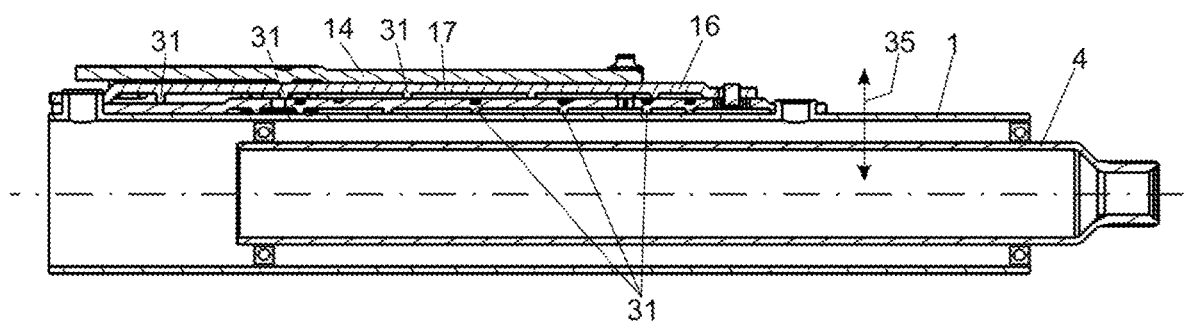
FIG. 6 is a sectional view of an example casing tube with an energy absorption device assembled thereon.
Figure 7:
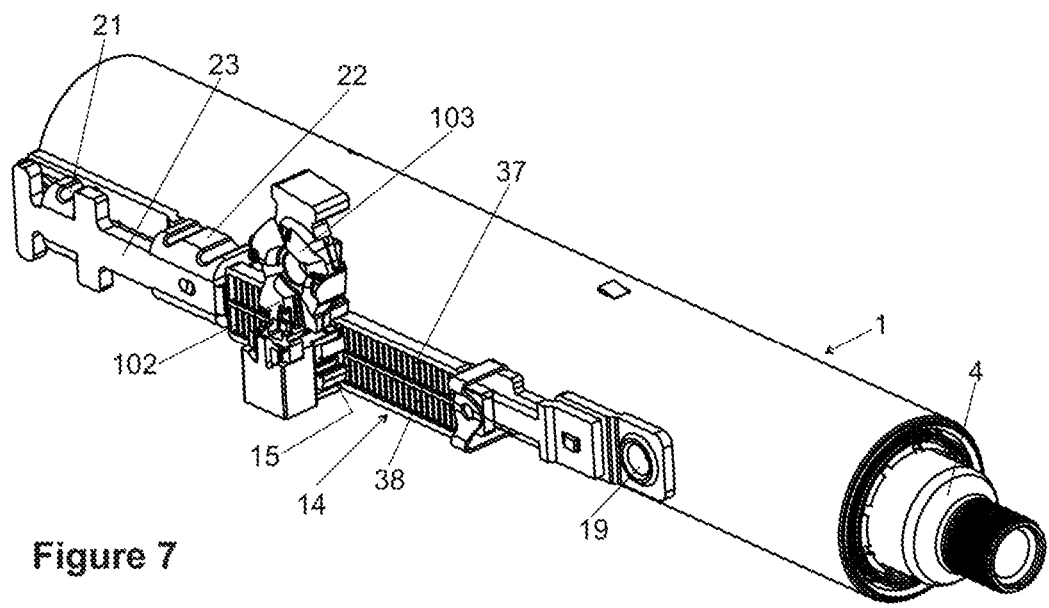
FIG. 7 is a perspective view of an example casing tube with an energy absorption device, prior to a crash event.
Figure 8:
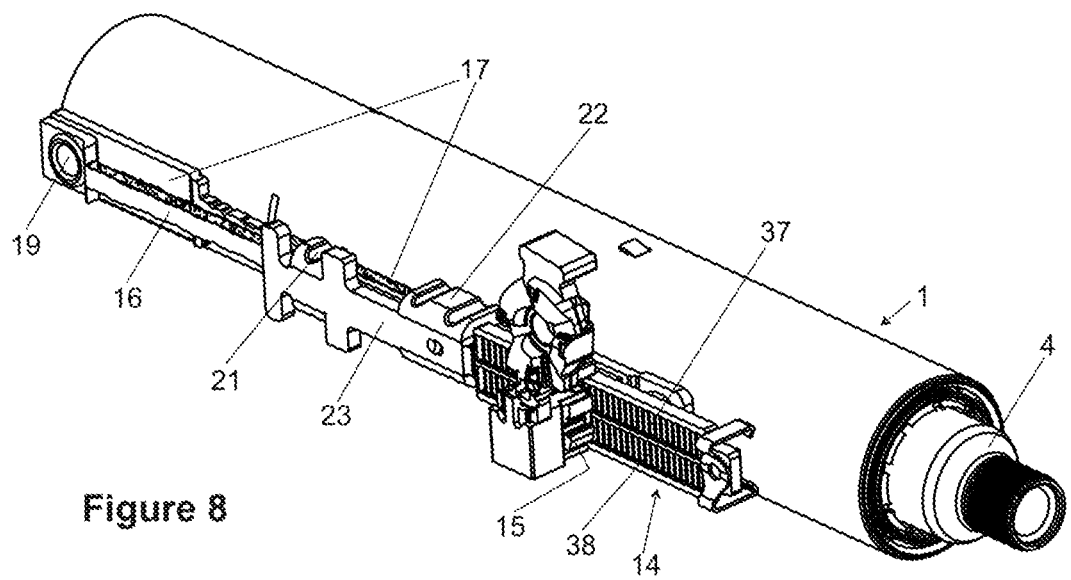
FIG. 8 is a perspective view, similar to that of FIG. 7, of an energy absorption device, after a crash event.

As can best be seen in FIGS. 2 and 3, the casing tube 1 is provided with a rack plate 14 that is aligned in the axial direction 3. An arrestor element 15 which is capable of being pushed against the rack plate 14 by the tightening device 10 and which is operatively connected to the second lifting disk 102 is likewise provided with teeth. When the arrestor element 15 in the tightened state of the tightening device 10 is pressed against the rack plate 14, the teeth of the arrestor element 15 mesh with the teeth of the rack plate 14 such that the rack plate 14 is fixed so as to be immovable in relation to the holder 6. A displacement of the rack plate 14 in relation to the holder 6 in the axial direction 3 is no longer possible in this instance. The rack plate 14 comprises two mutually adjacent rows of teeth 37, 38. The toothing of the one row of teeth 37 in relation to the toothing of the other row of teeth 38 herein is disposed so as to be slightly offset by half a tooth width, so as to improve the engagement behavior with the arrestor element 15.

In order for the casing tube 1 in the normal operation of the vehicle to be displaced in the axial direction 3 in relation to the casing unit 2, the tightening device 10 has to be released by way of the activation lever 12, that is to say transferred from the fixing position to the releasing position, wherein the arrestor element 15 is raised from the rack plate 14 and a displacement of the rack plate 14 in the axial direction 3 in relation to the arrestor element 15 is possible. The arrestor element 15 per se cannot be displaced in the axial direction in relation to the holder 6 and the casing unit 2, since the tensioning bolt 11 is prevented from such a displacement by the vertical slots 9. However, the tensioning bolt 11 can be displaced in the vertical direction 7 in the vertical slots 9. On account thereof, the casing unit 2, conjointly with the casing tube 1 disposed therein, is pivoted in the vertical direction 7. The tightening device 10, conjointly with the tensioning bolt 11, the activation lever 12, and the arrestor element 15 is also pivoted collectively with the casing tube 1 and the casing unit 2 in the vertical direction 7 such that arrestor element 15 at all times remains in the region of the rack plate 14.

As can best be seen in FIGS. 3 to 6, two deformation strips 16, 17 which are aligned in the axial direction 3 are disposed on the casing tube 1, wherein a first deformation strip 16 is disposed on top of the second deformation strip 17. The second deformation strip 17 is disposed directly on the surface of the casing tube 1. For fastening to the casing tube 1, the latter is provided with fastening elements 18 which protrude beyond the surface of the casing tube 1 and through corresponding openings 19 at the ends of the deformation strips 16, 17.

The rack plate 14, at the end 20 thereof that lies in the travel direction of the vehicle, is connected to two deformation slides 21, 22, wherein the deformation slides 21, 22 and the rack plate 14 are configured as a single-piece integral formed sheet metal component. A coupling rail 23 connects the end 20 of the rack plate 14 to the two deformation slides 21, 22. A clamping spring 141 serves as a downholding element and, on the side facing away from the first deformation slide 22, fastens the rack plate 14 to the second deformation strip 17 such that any radial raising of the rack plate 14 in the crash event is prevented.

For example, when the driver in the crash event impacts the steering wheel, very high forces in the travel direction, which in the case of a closed tightening device 10 can cause a displacement of the casing tube 1 in the axial direction 3 in relation to the casing unit 2, act on the steering wheel and thus on the steering shaft 4 and the casing tube 1. Since the rack plate 14 by way of the arrestor element 15, by means of the tightening device 10, is connected in an immovable manner to the casing unit 2, said rack plate 14 cannot move in the axial direction 3. The same applies to the deformation slides 21, 22 which are connected to the rack plate 14 by way of the coupling rail 23. When the casing tube 1 in the crash event is forcibly displaced by a high force in the axial direction 3 in relation to the casing unit 2, said casing tube 1 entrains the two deformation strips 16, 17 which are fixedly connected to the casing tube 1. On the other hand, since the two deformation slides 21, 22 cannot be displaced in relation to the casing unit 2, said two deformation slides 21, 22 are pulled over the associated deformation strips 16, 17 and herein deform the latter. The deformation energy that has to be generated for the deformation of the deformation strips 16, 17 is thus absorbed from the kinetic energy. The casing tube 1, and the impacting driver by way of the steering shaft 4 and the steering wheel, herein are decelerated to the extent that kinetic energy is absorbed in both deformation strips 16, 17.

The energy absorption device according to the invention requires only very little installation space because the deformation strips 16, 17 and the rack plate 14 are disposed directly on top of one another on the same side of the surface of the casing tube 1.

In order for the first deformation slide 21 to deform only the first deformation strip 16, and for the second deformation slide 22 to deform only the second deformation strip 17, the second deformation strip that lies closer to the casing tube 1 transverse to the axial direction 3 is designed so as to be slightly wider than the first deformation strip 16. The first deformation slide 21 by way of the short flanks thereof comprises only the first deformation strip 16. The short flanks of the first deformation slide 21 herein jam the narrow sides of the first deformation strip 16 so firmly that said narrow sides deform the first deformation strip 16 as soon as the first deformation slide 21 is pulled in the axial direction 3 over the first deformation strip 16.

The second deformation slide 22, transversely to the axial direction 3, is designed so as to be wider, and the longer flanks thereof reach the wider second deformation strip 17 lying below the first deformation strip 16 such that the second deformation slide 22 by way of the longer flanks thereof jams the narrow sides of the second deformation strip 17 so firmly that said second deformation slide 22 deforms the second deformation strip 17 as soon as the second deformation slide 22 is pulled over the second deformation strip 17.

The second deformation slide 22 herein also encompasses the first deformation strip 16. However, since the second deformation slide 22 is wider than the first deformation slide 21, the flanks of the second deformation slide 22 do not embrace the narrow sides of the first deformation strip 16. The first deformation strip 16 is therefore not deformed when the second deformation slide 22 is pulled in the axial direction 3 over the former.

The first deformation slide 21 comprises bolt-type protrusions 211 which interact with the narrow sides of the deformation strip 16 and deform the latter in the case of a relative movement. The protrusions 211 are mutually spaced apart, wherein the spacing between the protrusions 211 is less than the width of the deformation strip 16, that is to say the width of the narrow sides of the deformation strip 17. The bolt-type protrusions 211 comprise a radiused surface.

The second deformation slide 22 comprises a first pair of bolt-type protrusions 221 and a second pair of bolt-type protrusions 222, said bolt-type protrusions 221, 222 interacting with the narrow sides of the deformation strip 17 and deforming the latter in the case of a relative movement. The protrusions 221, and the protrusions 222, respectively, are mutually spaced apart, wherein the spacing between the protrusions 221, and the protrusions 222, respectively, is less than the width of the deformation strip 17, that is to say the width of the narrow sides of the deformation strip 17. The bolt-type protrusions 221 and the bolt-type protrusions 222 comprise a radiused surface. It can be provided that the mutual spacing of the second protrusions 222 is less than, equal to, or larger than the mutual spacing of the first protrusions 221. The crash properties can be set in terms of construction on account thereof.

Figure 9:
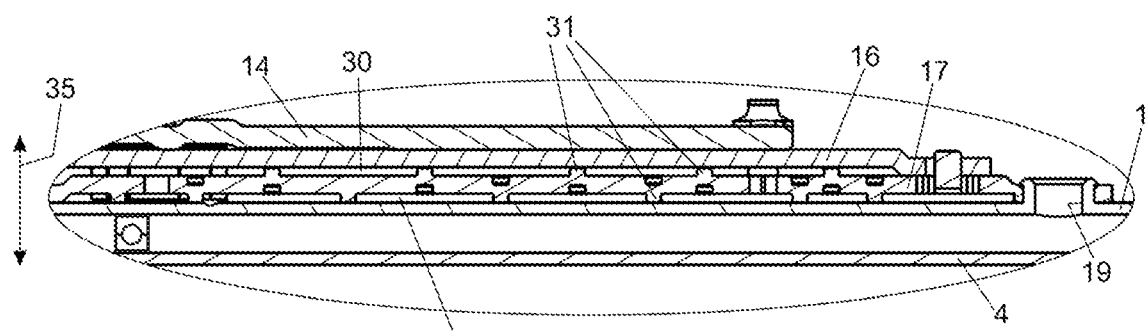
FIG. 9 is a longitudinal sectional view of a detail of another example energy absorption device having spacers assembled on a casing tube, between first and second deformation strips.

As can be seen in FIG. 9, it is possible that the second deformation strip 17 in an alternative embodiment is in each case provided with studs 31 on the lower side 29 of said deformation strip 17 that faces the casing tube 1 as well as on the upper side 30 of said deformation strip 17 that faces the first deformation strip 16, said studs 31 serving as spacers. On account of this measure it is possible for the two deformation strips 16, 17 to be disposed directly on top of one another on the casing tube 1. This enables a particularly compact construction mode. It is ensured by the studs 31 that the deformation strips are not bent in such a manner that said deformation strips slip out of the respective deformation slides. Moreover, space for the deformations of the narrow sides of the deformation strips 16, 17 is thus made available such that mutual impediments of the functions of said deformation strips 16, 17 are avoided.

The invention permits a particularly compact construction mode which is associated with lower production costs and nevertheless guarantees a reliable functioning of the energy absorption device. Besides the construction mode having two deformation strips, described in detail here as the exemplary embodiment, the invention also comprises further construction modes having three, four, or even more, deformation strips which are recommended for specific applications in which even more energy has to be absorbed in the crash event than is possible by way of two deformation strips.

LIST OF REFERENCE SIGNS

1 Casing tube
2 Casing unit
3 Axial direction
4 Steering column
5 End
6 Holder
7 Vertical direction
8 Clamping jaws
9 Vertical slots
10 Tightening device
11 Tensioning bolt
12 Activation lever
13 Bore
14 Rack plate
15 Arrestor element
16 First deformation strip
17 Second deformation strip
18 Fastening element
19 Opening
20 End
21 First deformation slide
22 Second deformation slide
23 Coupling rail
24
25
26
27
28
29 Lower side
30 Upper side
31 Studs/spacers
32
33
34
35 Radial direction
36
37 Row of teeth
38 Row of teeth

What is claimed is:

1. A steering column for a motor vehicle comprising:
an inner casing tube that rotatably mounts a steering shaft;
an outer casing unit that is connectable to a vehicle chassis, wherein the inner casing tube is received in the outer casing unit so as to be displaceable and fixable in an axial direction; and
an energy absorption device that is operatively disposed between the inner casing tube and the outer casing unit, wherein the energy absorption device absorbs at least some energy in a crash event where the inner casing tube is telescopically displaced relative to the casing unit, wherein the energy absorption device comprises at least two deformation strips that are fastened to the inner casing tube, wherein a deformation slide is disposed on each of the at least two deformation strips, wherein each deformation slide is connected to the outer casing unit and encompasses and jams external narrow sides of the respective deformation strip, wherein each deformation slide deforms the respective deformation strip when the deformation strips in a crash event are displaced relative to the deformation slides in the axial direction;
wherein the at least two deformation strips are disposed on a same side of the inner casing tube.

2. The steering column of claim 1 wherein the deformation slides are connected to the outer casing unit by way of a rack plate, wherein an arrestor element with teeth is connected to the outer casing unit by way of a tightening device that pushes the arrestor element against the rack plate so as to in a traveling operation fix the rack plate in an immovable manner on the outer casing unit such that displacement of the inner casing tube relative to the outer casing unit in a crash event is possible only by activating the energy absorption device.

3. The steering column of claim 1 wherein a first deformation strip and a second deformation strip of the at least two deformation strips are disposed on top of one another, wherein the second deformation strip lies closer to the inner casing tube and is wider than the first deformation strip, wherein a second deformation slide of the deformation slides is disposed on the second deformation strip and is wider than a first deformation slide of the deformation slides that is disposed on the first deformation strip, wherein the second deformation slide encompasses the first and second deformation strips but jams only the second deformation strip, wherein the first deformation slide comprises and jams only the first deformation strip.

4. The steering column of claim 3 wherein the first and second deformation strips are held at a mutual spacing by spacers and in a radial direction are fixed between the inner casing tube and a rack plate.

5. The steering column of claim 4 wherein the spacers are disposed on the second deformation strip.

6. The steering column of claim 4 wherein the spacers are disposed on an upper side of the second deformation strip that faces the first deformation strip and on a lower side of the second deformation strip that faces the casing tube.

7. The steering column of claim 4 wherein the spacers are configured as studs or as a web, with the spacers being molded in the second deformation strip.

8. The steering column of claim 4 wherein the rack plate comprises two adjacent rows of teeth, wherein toothings of the two adjacent rows of teeth are disposed so as to be mutually offset by half a tooth width.

* * * * *